United States Patent [19]
Emmons

[11] 3,802,908
[45] Apr. 9, 1974

[54] PROCESS FOR FORMING EXTERNAL MULTI-LAYER RESINOUS COATING ON CYLINDRICAL SURFACE AT AMBIENT TEMPERATURE

[76] Inventor: Dalphon L. Emmons, 6412 E. 58th St., Tulsa, Okla. 74135

[22] Filed: Feb. 28, 1972

[21] Appl. No.: 229,826

[52] U.S. Cl............ 117/72, 117/75, 117/94, 118/314, 118/320, 118/DIG. 11, 156/188, 156/315, 156/429
[51] Int. Cl............................................ B44d 1/14
[58] Field of Search......... 117/94, 132 CB, 161 UH, 117/161 UD, 75; 118/320, 314, DIG. 11; 156/187, 188, 429, 315, 392

[56] References Cited
UNITED STATES PATENTS

| | | | |
|---|---|---|---|
| 3,616,006 | 10/1971 | Landgraf et al. | 156/392 X |
| 2,587,430 | 2/1952 | Baldwin | 117/132 CB |
| 2,626,222 | 1/1953 | Spencer | 117/94 |
| 2,820,249 | 1/1958 | Colombo | 118/DIG. 11 |
| 2,978,357 | 4/1961 | Fugazza | 117/94 X |
| 3,126,306 | 3/1964 | Sherman | 156/187 |
| 3,661,624 | 5/1972 | Versoy et al. | 118/DIG. 11 |
| 2,700,631 | 1/1955 | Ferguson et al. | 156/187 |

Primary Examiner—Ralph Husack
Attorney, Agent, or Firm—Ralph E. Zimmerman

[57] ABSTRACT

A process for forming multi-layer resinous coating comprising applying flowable heat softened resinous material directly to the external surface of a rotating cylindrical pipe at ambient temperature.

4 Claims, 3 Drawing Figures

PATENTED APR 9 1974   3,802,908

PROCESS FOR FORMING EXTERNAL MULTI-LAYER RESINOUS COATING ON CYLINDRICAL SURFACE AT AMBIENT TEMPERATURE

BACKGROUND OF THE INVENTION

The present processes which are presently used to cover the outer surfaces of pipes exposed to extreme changing temperatures and weather with plastic coating require various methods of preparation. In some instances the pipe to be coated is preheated and then passed through a fluidized bed of micro-size particles of polyethylene or equivalent thermoplastic coating materials such as polyvinyl chloride, polyvinylidene chloride or polypropylene which adher to the heated pipe surface. The heated softened thermoplastic forms a coating on the pipe surface. This method of coating requires high temperature heating of the pipe surface with possible deformation of the pipe structure to obtain coating of sufficient thickness for large diameter pipes. On occasion because of high temperature the thermoplastic coating particles are burnt and as a result the burnt particles of the thermoplastic coating material cause poor bonding of the coating material to the metallic surface of the pipe. Poor bonding of the thermoplastic coating material when exposed to the elements of nature cause the coating to break down resulting in exposure and a deterioration of the metal pipe itself. There are other forms of coating methods for applying thermoplastic coatings to pipe surfaces, one which is presently used is the application of thermoplastic coating by extruding through a spiral ring applicator selected coating materials onto the exterior surfaces of pipe. This method of coating also presents a problem of obtaining a proper bond of the coating material to the exterior surface of the pipe. It has been discovered that the added step of rolling the coated surface with rollers to obtain better bonding has not substantially improved bonding of the composite coating. Still other methods of coating cylindrical surfaces are known which require preheating the surface of the pipe and application of an extruded protection coating by rotating the pipe and moving the pipe longitudinally to form a spiral lapped coating on the pipe surface. The speed of rotation of the pipe and the speed of the longitudinal movement of the pipe determine the degree of lapping of the coating material. This method also presents a problem of deterioration of the coating upon exposure to extreme climate conditions. The fumes and smoke from the hot application of asphaltic compounds as coating materials adds contamination to the environment and is hazardous to the health of the workers.

OBJECTS OF THIS INVENTION

The object of this invention is to disclose a method of coating to produce an improved coated cylindrically pipe surface without the necessity of preheating the pipe before application of the coating material.

Another object of this invention is to disclose a method of coating cylindrical metal surfaces to produce a tight bond between the cylindrical surface of the metal surface and the coating material.

And still another object of this invention is to disclose a method of coating cylindrical bodies so as to form a protective coating in which the thermoplastic coating materials are tightly bound together as a coating unit to the surface of the cylindrical body.

Another object of this invention is to disclose a method of forming a coating on cylindrical metal surfaces which will withstand extreme changes of weather conditions without breaking the coating and exposing the metallic surface of the pipe.

Other important objects and advantageous features of this coating method will become apparent from the following description of the invention, and the illustrative drawings of the coating method.

DESCRIPTION

The thermoplastic coating method in accordance with this invention contemplates the application of heated thermoplastic materials applied onto a cylindrical surface, while the cylindrical surface is at ambient temperature. The specific surface shown in the illustrative drawing being a pipe surface. The invention contemplates the application of the heated thermoplastic material to a rotating cylindrical surface at ambient temperature moving longitudinally at a predetermined speed. The speed of the rotation, the longitudinally movement of the pipe and the size of the die in the extruder determines the thickness of the coating material on the cylindrical surface. Initially the pipe preferable with a clean cylindrical surface is moved into the coating station. The pipe surface can be cleaned by sand blasting at ambient temperature. The first heat softened adhesive plastic coating material is applied to the cylindrical surface of the pipe at ambient temperature, the heat softened ribbon of plastic material forming in a half lapped spiral position on the pipe surface. The heat softened plastic flows into the surface structure of the pipe to form a tight bond preventing air and fluid flow across the surface of the pipe. Immediately following the application of the first plastic coating a second application of heated coating material is applied in an over-lapping pattern directly to the first applied coating by extrusion in a manner similar to the manner as previously described for the application of the first coating.

Although the preferred embodiment confines the coating process to a first and second coating application it is understood that the application of additional coatings of heated plastic material to the first and second coating application is within the scope of this invention.

Figure 1:
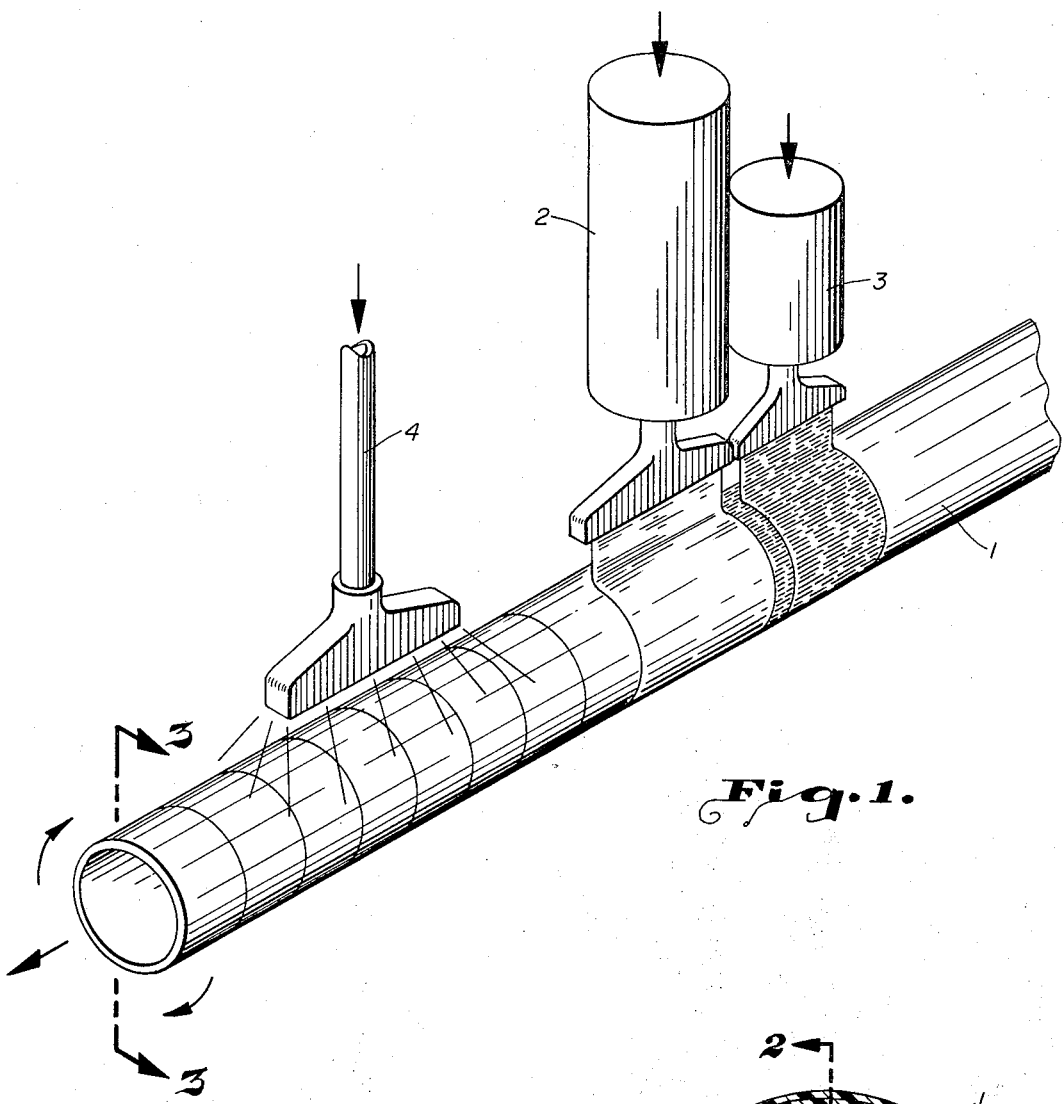
FIG. 1 shows in perspective a plan view of suitable apparatus including multiple die extruders and cooling means for extruding resinous coating materials onto the pipe surface.

Following the applications of the first and second coating application to the cylindrical surface, the coating is air cooled or cooled by a water spray, see 4, FIG. 1, to set the coating materials tight to the cylindrical surface. Since the metal pipe is not preheated, the plastic coating material will set tightly around the cylindrically surface of the pipe.

The preferred embodiment used in the first coating operation is an adhesive composition containing 100 parts by weight of a butyl rubber known as "Polysar" manufactured by Polymer Corporation, Sarnia, Ontario, Canada; 50 parts by weight of a magnesium silicate known as "Mistrome Vapor" manufactured by Desert Minerals, California, U.S.A., which is useful as a re-enforcing filler; 20 parts by weight of a plasticizer known as "Indio H-100" manufactured by Amoco Oil Corporation, Chicago, Ill., U.S.A; 50 parts by weight of a polyolefin known as "Wingtack 95" manufactured by Goodyear Chemical Corporation, Akron, O., U.S.A.; and two parts by weight of copper inhibitor No. 50 — manufactured by Dupont Company, Wilmington, Del., U.S.A. The preferred second coating composition is a dense polythylene, Poly No. 99-A manufactured by Dupont Company, Wilmington, Del., U.S.A., with an ultra violet ray protector added. A small amount of carbon black as an ultra-violet ray protector such as "Union MB No. 13" manufactured by Union Carbide Corporation, New York, N.Y., U.S.A., is suitable for this application. The amount of carbon black added is a matter of choice, the amount added should be sufficient to act as a ultra-violet shield to prevent decomposition of the coated surface.

Referring now to FIG. 1 which shows apparatus suitable for performing the method of coating disclosed herein. The pipe 1 at ambient temperature is shown being coated by heat softened coating materials which are extruded onto the cylindrical surface of pipe 1 from extruders 2 and 3. The pipe 1 is rotatably moved in a longitudinal lineal direction into the coating station containing a first extruder 2 and second extruder 3 in a juxaposition. The first extruder 2 contains a heat softened thermoplastic adhesive coating compound in the temperature range of approximately 260° – 310° F. The butyl rubber composition shown herein is applied to the cylindrical surface through a die opening in extruder 2 preferably in thickness of 8 mils, however, the thickness can be in the range of 3 – 15 mils. The extruded butyl rubber coating compound is applied in half lapped layers to form a smooth coating. Immediately following the application of the butyl rubber coating compound a second protective coat of heat softened thermoplastic materials such as polyethylene, polyvinyl chloride, polyvinylidene chloride is applied to the cylindrical surface through the die-opening in extruder 3. The temperatures of extrusion vary with the coating being applied. As example, the suggested temperature of the protective coating for proper void free extrusion are:

Low Density Polyethylene — 350° – 400° F
High Density Polyethylene — 400° – 450° F
Polyvinyl Chloride — 300° – 400° F
Polyvinylidene Chloride — 300° – 400° F This protective coating is applied in over lapping layers in preferred ribbon thicknesses of approximately 40 mils., however, this thickness can vary in the range from 10 to 100 mils. The pattern of over lapping coating is a matter of selection and is regulated by the longitudinal movement of pipe 1 with constant rotating speed of pipe 1 will increase the overall thickness of the protective coating. The second coating or the protective coating is applied immediately to the first adhesive coating layer. The immediate application of this second heat softened coating causes the first and the second coating to form a strong bond so that the two coatings form an integral coating unit on the pipe surface which is resistant to all types of climatic changes. Previously, the application of different coating materials by other methods on pipe surfaces have resulted in splitting and cracking of the protective coating resulting in deterioration of the pipe surface.

EXAMPLE 1

Ten 2 foot sections having a diameter of 2 inches were coated at ambient temperature by the method disclosed. A butyl rubber composition heat softened at 310° F as described herein as preferred embodiment was extruded in 8 mil ribbons onto the pipe surface in half lapped layers. Half lapping caused the adhesive coating to flow into holiday areas of the heat softened adhesive coating being applied in this manner. The polyethylene protective coating was extruded immediately onto the butyl rubber composition to form a integral coating unit on the surface of the pipe. The coated pipe was then submerged into a salt water bath following the United States ASTM Specification and tested for 45 days for disbonding of the coating. At the end of 45 days the pipe sample was removed and examined. The coating was found to be tightly bound in all respects to the pipe surface thus substantiating the effectiveness of the coating method described herein.

Figures 2, 3:
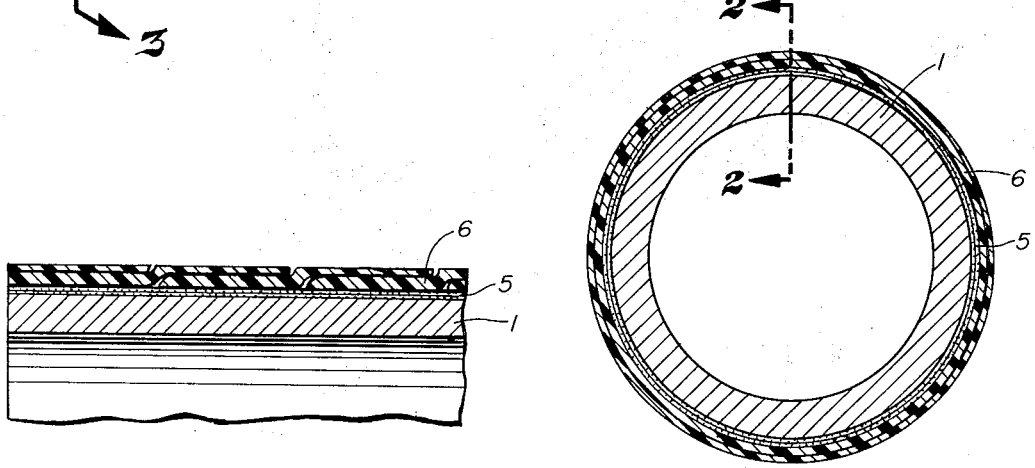
FIG. 2 shows a fragmentary longitudinal cross-section of the pattern of the multi-layers of the coating materials on a cylindrically pipe surface produced by this method of coating.
FIG. 3 is a fragmentary crossectional view of the pattern of multi-layers of coating material on the cylindrical pipe surface produced by the disclosed method of coating.

Reference is made to FIG. 2 and 3 which are crossectional views showing the arrangement of the adhesive coating layer 5 and the protective coating 6 on a pipe surface. As was previously stated the thickness of the first and second coating is determined by the die opening in the extruders 2 and 3, the speed of rotation and longitudinal lineal movement of the surface to be coated.

It will, of course, be understood that various details of construction may be varied through a wide range without departing from the principles of this invention, and it is, therefore, not the purpose to limit the patent granted herein otherwise than necessitated by the disclosure.

I claim:

1. A method of forming a multi-layer coating on a elongated clean and dry cylindrical body the steps comprising:

A. rotating and moving a cylindrical body in a progressive lineal direction to a first and a second coating station;

B. extruding an adhesive heat softened thermoplastic coating onto the outer surface of the said cylindrical body in a spiral pattern, at the said first coating station; the said cylindrical body being at ambient temperature;

C. extruding a protective heat softened thermoplastic coating immediately thereafter onto the surface of the said adhesive heat softened thermoplastic coating at the said second coating station;

D. Cooling the said coated cylindrical surface to form a hard thermoplastic protective surface on the said outer surface of the said cylindrical body.

2. The method as claimed in claim 1 where the said first and second coating stations are located in juxaposition and the said protective coating is applied immediately in at least half a lapped layers directly following the application of the said adhesive thermoplastic, coating, the said adhesive thermoplastic coating being applied in at least half lapped layers onto the said surface of the said cylindrical body.

3. The method as claimed in claim 1 where the said adhesive thermoplastic coating is butyl rubber and the said protective thermoplastic coating is selected from a group consisting of polyethylene, polyvinyl chloride and polyvinylidene chloride.

4. The method as claimed in claim 3 where the said adhesive butyl rubber is heated for extrusion in the range of 260° – 310° F. and the said protective thermoplastic coating is heated for extrusion in the range of 350° – 450° F.

* * * * *